A. F. COOPER.
Carriage Wheel Hub.

No. 102,657.

Patented May 3, 1870.

Witnesses:

Inventor:
Almond F. Cooper.

United States Patent Office.

ALMOND F. COOPER, OF SAN FRANCISCO, CALIFORNIA.

Letters Patent No. 102,657, dated May 3, 1870.

IMPROVEMENT IN CARRIAGE-WHEEL HUB.

The Schedule referred to in these Letters Patent and making part of the same.

*To all whom it may concern:*

Be it known that I, ALMOND F. COOPER, of San Francisco, in the county of San Francisco and State of California, have invented certain Improvements in Carriage-Wheels, of which the following is a full, clear, and exact description, reference being had to the accompanying drawings making part of this specification, in which—

In that class of carriage-wheels in which rubber is applied between the axle-box and hub, when the rubber is confined tightly on all sides within a space of a size only just sufficient to contain it, as has heretofore been customary, the hub is liable to be split or burst open on account of the absence of any space into which the rubber may expand when subjected to pressure, while no appreciable benefit is derived from the elasticity of the rubber, as repeated experiments have proved that rubber cannot be compressed when confined tightly on all sides.

My invention has for its object to overcome these difficulties, and consists in providing that portion of the end of the axle-box to which the rubber is applied and the nut with grooves or cavities into which the rubber may expand when subjected to pressure, by which construction the necessary relief is afforded, while at the same time the ends of the rubber packing may be confined between a flange on the outer end of the axle-box or the nut and a shoulder on the inside of the hub, and thus held securely in place, and the oil or dirt also prevented from coming into contact therewith.

And my invention also consists in perforating the rubber packing so as to afford still further space for its expansion, especially when pressure is applied in a direction paralleled to the axis of the hub, as is the case when the wheel is subjected to lateral shocks or concussions.

To enable others skilled in the art to understand and use my invention, I will proceed to describe the manner in which I have carried it out.

In the said drawings—

A represents a wooden carriage-hub, the interior of which is bored out centrally to receive the axle-box B, the opening being enlarged at its ends for the reception of rubber packing-rings C D, the inner ends of which rest against shoulders, $a\ b$, formed on the inside of the hub.

One end, $c$, of the axle-box B is enlarged so as to fit the interior of the ring C.

The opposite end of the axle-box is provided with a screw-thread, over which fits a nut, E, the diameter of which corresponds to that of the interior of the rubber ring D.

Figure 1:
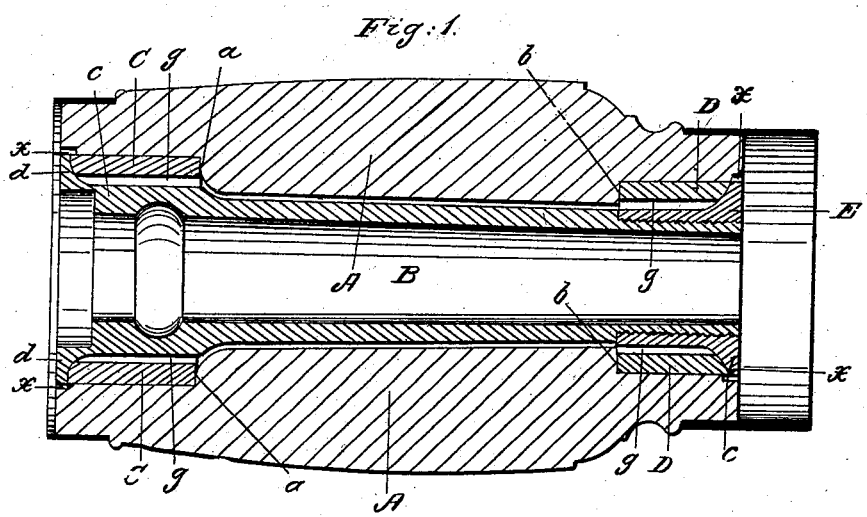
Figure 1 is a longitudinal section through the center of the hub and axle-box of a carriage-wheel with my improvements applied thereto.
Figure 2:
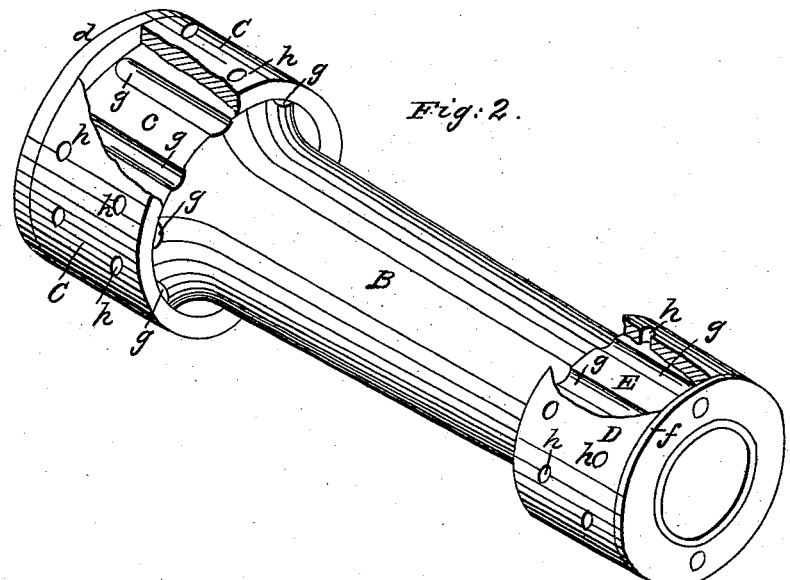
Figure 2 is a perspective view of the axle-box and its nut with the rubber packing applied thereto, a portion of the packing being broken away to show the grooves beneath.

The outer end of the nut E is also provided with a flange, $f$, which covers the outer end of the ring D, and is for the same purpose as the flange $d$, and when the nut is screwed up into place, as seen in fig. 1, the axle-box and the rubber rings are all held firmly and securely in place within the hub, the central portion of the interior of which is cut away sufficiently to allow of the yielding of the box B within it.

The outer ends of the hub are also beveled or slightly cut away at $x$, so as not to interfere with the movement of the flanges $d\ f$, when the box yields within the hub.

It is evident that when the rubber rings C D are confined between the flanges $d\ f$ and shoulders $a\ b$, as above described, some provision must be made for the expansion of the rubber when subjected to pressure; otherwise, no benefit would be derived from its elasticity, and the hub would be liable to burst or split open. I therefore provide the enlarged portion $c$ of the axle-box and the nut E with longitudinal grooves $g$, into which the rubber may expand when subjected to pressure, and at the same time to secure the full benefit of its elasticity and avoid all liability of the hub being split or burst open.

The rubber rings may be made to adhere to the interior of the hub by the employment of rubber or other suitable cement, and it will be seen that when the rubber packing is expanded into the grooves $g$ the liability of the turning of the axle-box within the hub, in case an unusual strain should be brought upon it, will be entirely avoided, thus enabling me to dispense with the ordinary grooves in the hub for preventing the axle-box from turning therein, which tend to weaken it to some extent.

Instead of longitudinal grooves, $g$, cavities of any suitable form may be employed with equally beneficial results, and these grooves or cavities may be formed in the process of casting, so as not to increase the cost of manufacturing the axle-box.

The rubber rings C D are perforated at $h\ h$, these perforations affording still further space, into which the rubber may expand, especially when, from lateral shocks or concussions upon the wheel, it is subjected to pressure in a direction parallel to the axis of the hub.

Although I prefer to employ perforated rings, C D, in connection with the grooves $g$, yet the perforations may be dispensed with, the grooves alone being made to afford the necessary space for the expansion of the rubber; or, in some cases, the perforations in the packing rings might be made to afford the required space without the employment of the grooves $g$.

The rubber packing rings should be cut of a little greater length than the bearing surface to which they are to be applied, so that when the nut E is screwed up they will pack or fit tightly within the hub.

I hereby disclaim as of my invention, making the flanges of the collars on the ends of the said box or bushing of such size as to cover the ends of the rubber tubes and allow the passage of the bolts over the rubber through the flanges and hub.

What I claim as my invention, and desire to secure by Letters Patent, is—

The axle-box B and its nut E, when constructed with grooves or cavities $g$, to allow of the expansion of the rubber, as set forth.

Also, the perforated packing rings C D, operating substantially in the manner and for the purpose described.

Also, the perforated packing rings C D, in combination with the grooved axle-box D and grooved nut D, as and for the purpose described.

Witness my hand this 13th day of January, A. D. 1870.

ALMOND F. COOPER.

Witnesses:
P. E. TESCHEMACHER,
N. W. STEARNS.